Nov. 27, 1928.
N. F. B. ÖSTBERG
1,693,492
RAKE
Filed June 21, 1924
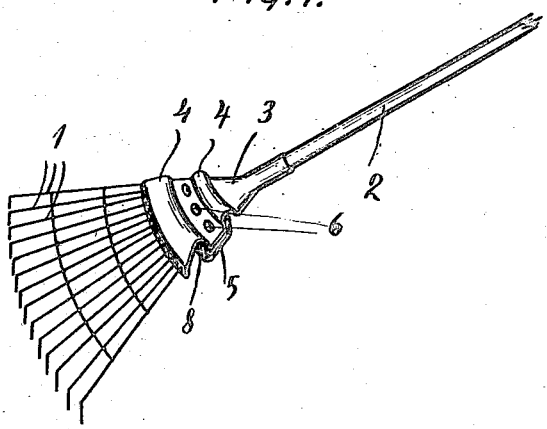
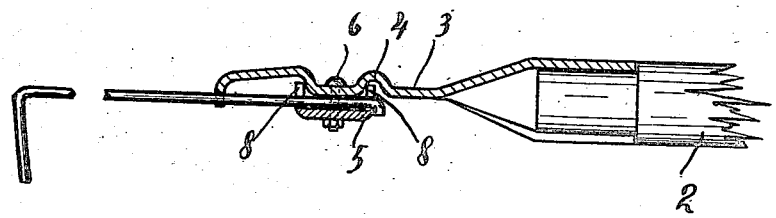

Patented Nov. 27, 1928.

1,693,492

UNITED STATES PATENT OFFICE.

NILS FREDRIK BERNHARD ÖSTBERG, OF TUREBERG, SWEDEN.

RAKE.

Application filed June 21, 1924, Serial No. 721,583, and in Sweden June 25, 1923.

The present invention has reference generally to improvements in garden implements and more particularly relates to an improved rake.

This invention relates to a rake, which by construction and function is something intermediate between a usual rake and a broom and which may be considered as a combination of both. The teeth possess namely the yielding quality of the broom bristles, so that they slip snugly over unevennesses on the ground at the same time as they, like usual rake teeth, catch and hold the material raked.

It is one of the objects of this invention to provide a rake possessing the advantages mentioned and in attaining these advantages improved means are employed for detachably fastening the teeth with the handle.

Other objects as well as the nature, characteristic features and scope of the invention will be more readily apparent from the following description taken in connection with the accompanying drawings and pointed out in the claim forming a part of this specification.

The invention is clearly illustrated in the accompanying drawings, in which:—

Fig. 1 is a perspective view of the improved rake, and

Fig. 2 is an enlarged longitudinal sectional view thereof.

Similar characters of reference are employed in all of the above described views to indicate corresponding parts.

Referring now, more particularly, to the accompanying drawings there is provided a plurality of teeth preferably though not necessarily in the form of metal wires 1 of suitable thickness desirably extending fan-shaped in the direction of the handle 2 forming a suitable holder 3 which latter is of course connected to the handle. The holder 3 consists of a ferrule body portion which is engaged with the handle and a flared extended portion which is provided with transverse furrows or ridges 4 which act to reinforce the same and also provide grooves for accommodating side portions of the channel member which latter is slotted as at 8 at uniform distances to accommodate the tines or teeth 1. Suitable nut and bolt arrangements 6 are provided for clamping the channel member 5 to the flattened portion of the flared extension of the ferrule situated between the furrows so as to consequently maintain the tines on the holder.

At a little distance from the free ends the teeth are bent at an angle so that they may act as rake teeth. By accommodating the length of the teeth from the angle to the holder in accordance to the thickness of the wire the teeth may be given a suitable elasticity. Across the teeth at suitable distances from the holder 3 are arranged metal wires 9 and 10 the latter being preferably wound about the teeth. These wires are arranged so as to distribute the elasticity so that thinner or elastic wire may be used and also make the rake more effective thereby that one tooth may borrow elasticity from an adjacent tooth and all the teeth form one single elastic system. The wires also serve to hold the teeth in the right direction and at the same distance from each other. By making the holder of the elastic or yieldable material stiff teeth may also be made yielding with about the same effect.

It is believed in view of the foregoing that a further detailed description of the operation of the invention is entirely unnecessary. Likewise it is believed that the advantages of the invention will be readily apparent.

Having thus fully described the invention what is claimed as new and desired to be secured by Letters Patent is:—

A rake of the character described, including a handle, a head plate of sheet metal connected to the handle and provided with furrows transversely thereof for strengthening the head plate and also constituting grooves, a plurality of elongated yielding tines extending longitudinally from the head plate and arranged in spaced and fan-like formation in the same plane as the handle, a channel-shaped member having flanged portions which are received in the grooves and are also provided with slots for accommodating the inner portions of the tines, and means for detachably clamping and fastening the channel-shaped member to the under surface of the head plate.

In witness whereof, I have hereunto signed my name.

NILS FREDRIK BERNHARD ÖSTBERG.